S. J. CLARK.
MOLD AND DISHER.
APPLICATION FILED OCT. 15, 1909.

961,429.

Patented June 14, 1910.

Witnesses
J. S. Freeman.

Inventor
Samuel J. Clark,
By C. L. Parker, Attorney

UNITED STATES PATENT OFFICE.

SAMUEL J. CLARK, OF CORNWALL-ON-THE-HUDSON, NEW YORK.

MOLD AND DISHER.

961,429.  Specification of Letters Patent.  Patented June 14, 1910.

Application filed October 15, 1909. Serial No. 522,762.

*To all whom it may concern:*

Be it known that I, SAMUEL J. CLARK, a citizen of the United States, residing at Cornwall-on-the-Hudson, in the county of Orange and State of New York, have invented certain new and useful Improvements in Molds and Dishers, of which the following is a specification.

My invention relates to molds and dishers, and has particular reference to a device of this character embodying means for leveling off the contents of the same.

An important object of my invention is to provide a device of the above character, so constructed that the contents of the same will be cut loose from the mold and leveled off at the same time.

A further object of my invention is to provide a disher, which may be readily operated by one hand.

The final object of my invention is to provide a device of the above character, which will be simple in construction, easy to operate, and which will not get out of order.

My invention consists generally of a mold provided with a handle, cutters arranged within said mold, a leveling blade arranged near said mold, and common means of actuating said cutters and leveling blade.

Figure 1:
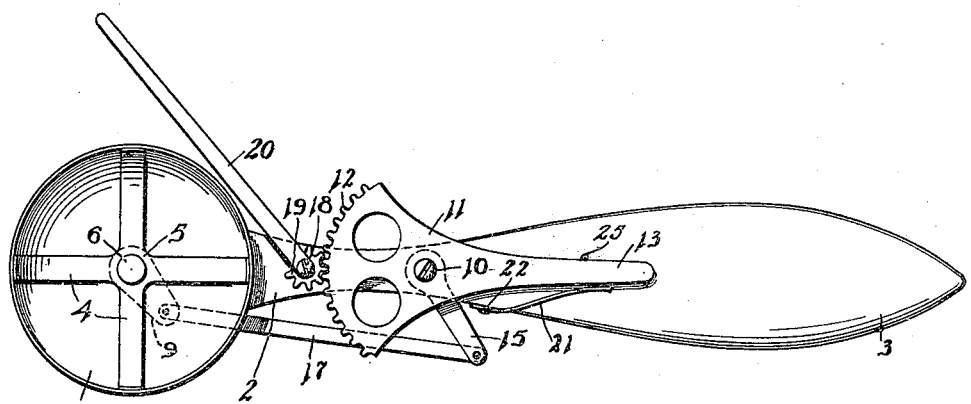
Figure 2:
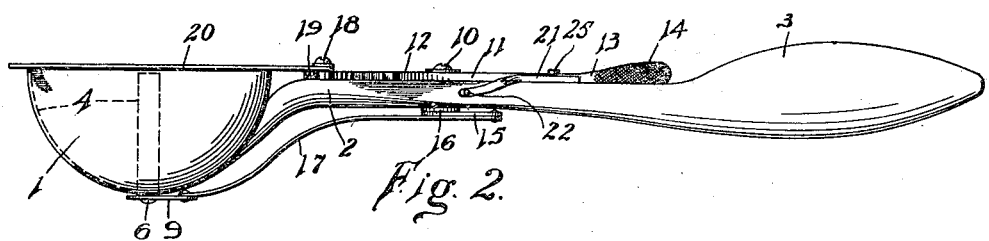

In the accompanying drawings, forming a part of this specification and in which like numeral references are used to designate like parts throughout the same, Figure 1 is a plan view of my device, and, Fig. 2 is a side view of the same.

In the preferred embodiment of my invention as shown, 1 designates a mold which is illustrated as semi-spherical in shape, and which is provided upon one side thereof with a handle comprising a shank 2 and a gripping portion 3. Within the mold 1, are arranged curved cutters 4, which are disposed at right angles to each other and posed at their inner ends to form merge together at their inner ends to form a centrally arranged section of material 5, centrally upon which is rigidly secured a pin 6, which is rotatably journaled through the center of said mold 1 and provided upon its outer end with a connecting arm 9. Centrally of the shank 2 of the handle is rotatably mounted a pin 10, which has an actuating device rigidly secured thereto upon the upper side of said shank, comprising a body portion 11, extending forwardly for forming a segmental rack 12 and rearwardly to form an operating lever 13, provided with the milled portion 14. Upon the opposite end of the rotatable pin 10, below the shank portion 2, is rigidly secured an arm 15 spaced away from said shank 2 by means of a washer 16, and pivotally connected at its outer end to one end of a curved connecting rod 17, which has its opposite end pivotally connected to the connecting arm 9. Forwardly of the pin 10, in alinement therewith and with the center of the mold 1, is rigidly secured a pin 18, upon which is rotatably mounted a pinion 19 carrying a leveling blade 20 rigidly secured thereto, and said pinion 19 being arranged to mesh with the segmental rack 12. The shank 2 is further provided upon one side thereof with a flat spring 21, suitably secured thereto as at 22, and having its free end in engagement with the operating lever 13 for returning the same to its normal position. By reference to Fig. 2, it will be seen that the upper side of pinion 19, is in horizontal alinement with the edge of the open side of the mold whereby the blade 20 will be made to scrape the edge of the mold or travel very near the same.

In the use of my disher the same is held in an inverted position by grasping the handle upon the portion 3, and the leveling blade 20 being in the position shown, in Fig. 1, the operator may readily scoop the mold full of the plastic material being handled. The operator then holds the disher so that the contents thereof will not readily fall out, preferably at an inclined position, and presses the operating lever 13, downwardly by using his thumb. When the lever 13 is pressed downwardly as above described, the segmental rack 12 will rotate clock-wise, which will cause the pinion 19 to rotate counter-clock-wise and the leveling blade 20 will be swung downwardly over the mold 1, for leveling of the contents of the same. While the leveling blade 20 is traveling across the mold 1, the arm 15 is swung to cause the rod 17 to travel forwardly as indicated by the arrow, which movement of rod 17 oscillates the arm 9, for rotating the cutters 4. This movement of the cutters 4 will loosen the contents of the mold, and when the same is invert (the open side downward) said contents will have been leveled off and will also readily fall from said mold. Upon the release of the operating lever 13, the same will be forced upwardly by spring 21, to assume approximately the position shown in Fig. 1, the leveling blade 20 being arranged to one side of the open side of the mold 1. The upward movement of the operating lever 13 caused by spring 21 is limited by the lug 25.

Having thus described my invention what I claim is:—

1. A device of the character described, comprising a mold provided with a handle, cutters movably mounted within said mold, a movable member for leveling the contents within said mold, and common means for actuating said cutters and said movable member, substantially as described.

2. In a device of the character described, the combination with a mold provided with a handle, of cutters movably mounted within said mold, a leveling blade mounted near said mold and adapted to move transversely of the same, an operating lever arranged upon said handle, and means connecting said cutters and said leveling blade with said operating lever, substantially as described.

3. In a device of the character described, the combination with a mold provided with a handle, of cutters arranged within said mold, a leveling blade adapted to move transversely of said mold, and common means for simultaneously moving said cutters and said leveling blade, substantially as described.

4. In a device of the character described, the combination with a mold provided with a handle, of rotatably mounted cutters arranged within said mold, a leveling blade rotatably mounted upon said handle near said mold and adapted to travel transversely of said mold, and an actuating device swingingly mounted upon said handle and having means associated therewith, whereby a movement of the same will cause a movement of said cutters and leveling device, substantially as described.

5. In a device of the character described, the combination with a mold provided with a handle, of cutters rotatably mounted within said mold, a pinion provided with a leveling blade rotatably mounted upon said handle, an actuating device swingingly mounted upon said handle, comprising an operating lever and a segmental rack for engagement with said pinion, and connecting means between said actuating device and said cutters, substantially as described.

6. In a device of the character described, the combination with a mold provided with a handle, of cutters arranged within said mold, a leveling blade adapted to move transversely of said mold, an actuating device for operating said cutters and said leveling blade, and means for returning said actuating device to its normal position, substantially as described.

In testimony whereof I affix my signature in presence of two witnesses.

SAMUEL J. CLARK.

Witnesses:
GEORGE A. DIEMER,
GEO. W. MAY.